United States Patent [19]

Healy

[11] Patent Number: 5,297,574
[45] Date of Patent: Mar. 29, 1994

[54] FUEL DISPENSING HOSE BREAKAWAY ASSEMBLY

[75] Inventor: James W. Healy, Hollis, N.H.

[73] Assignee: Healy Systems, Inc., Hudson, N.H.

[21] Appl. No.: 46,996

[22] Filed: Apr. 13, 1993

[51] Int. Cl.$^5$ .................. F16L 29/00; F16K 17/40
[52] U.S. Cl. .................. 137/68.1; 137/614.04; 285/133.1
[58] Field of Search ........... 137/68.1, 614.04, 614.03, 137/614, 614.05; 285/133.1, 135

[56] References Cited

U.S. PATENT DOCUMENTS 4,899,792  2/1990  Podgers ................. 137/68.1 X
5,014,743  5/1991  Makishima ............. 137/614.03

FOREIGN PATENT DOCUMENTS 616242  3/1961  Canada ................. 137/614.03

Primary Examiner—Martin P. Schwadron
Assistant Examiner—Kevin L. Lee
Attorney, Agent, or Firm—Fish & Richardson

[57] ABSTRACT

A breakaway assembly for use in combination with a fuel dispenser apparatus is disposed between a segment of the hose attached to a fuel dispenser unit and a second segment of the hose terminating in a nozzle. The breakaway assembly has body portions with a first, assembled condition and a second condition in which the body portions are separated. A fuel valve located in each of the body portion permits flow of fuel when the body parts are assembled and prevents flow upon separation. An element securing the body portions together releases engagement upon application of tension force to the hose, across the breakaway assembly, above a maximum level. In a preferred embodiment, the hose is coaxial and a vapor valve is also disposed within the breakaway assembly.

12 Claims, 2 Drawing Sheets

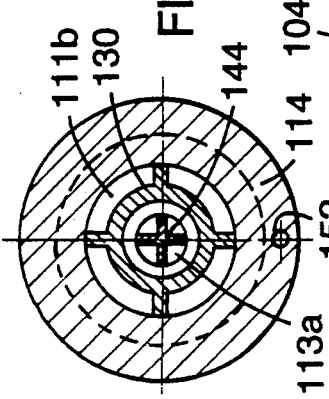
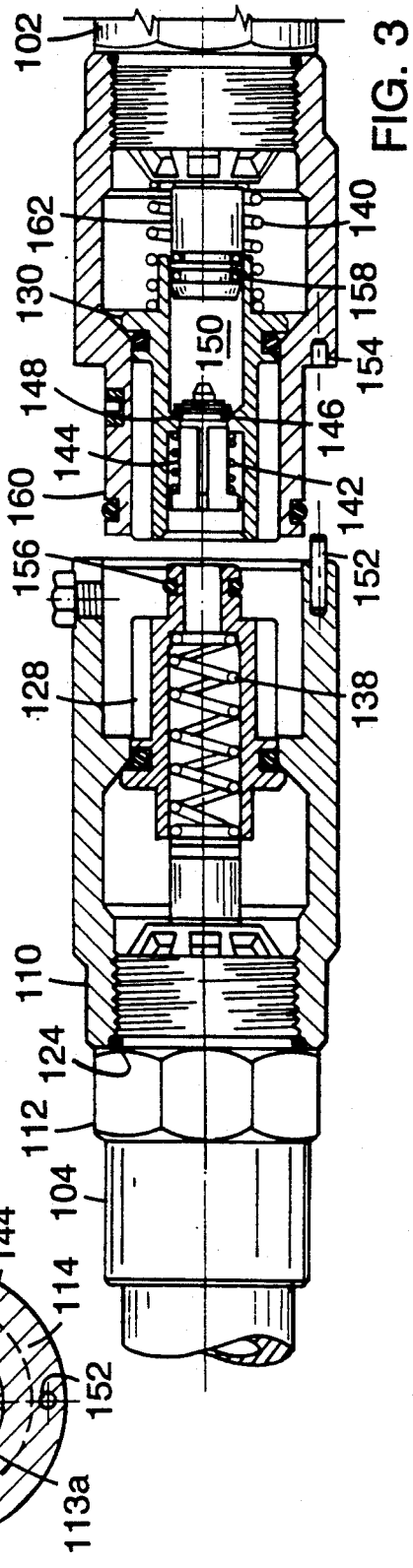
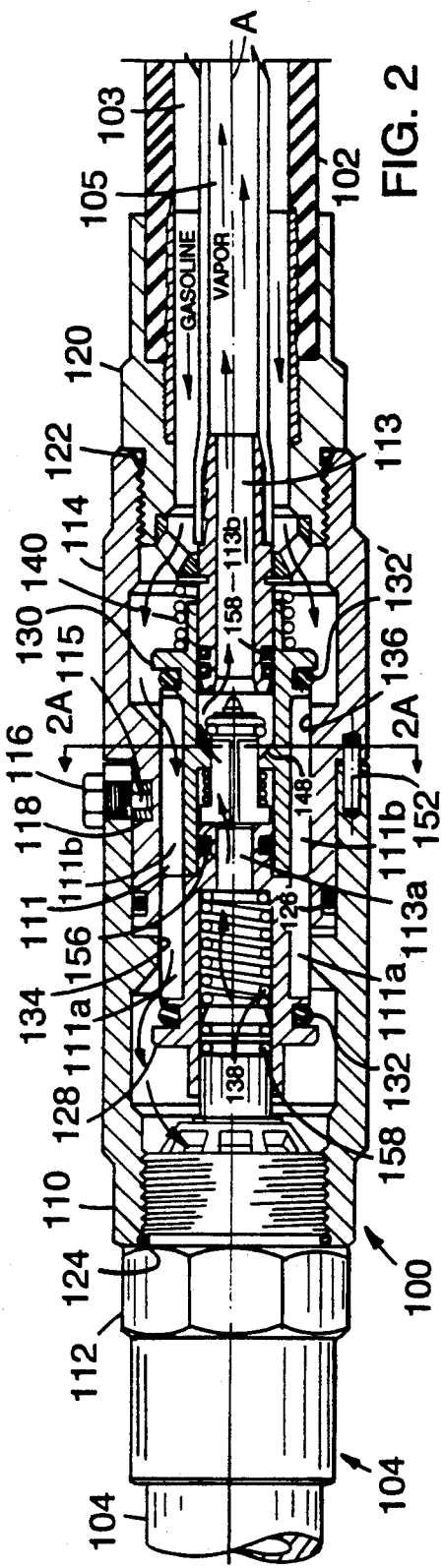

FUEL DISPENSING HOSE BREAKAWAY ASSEMBLY

BACKGROUND OF THE INVENTION

The invention relates to hoses for dispensing fuel and other flammable liquids.

Fuel dispensers such as those used for filling vehicle tanks at gasoline stations include a hose extending from the dispenser and terminating in a fuel delivery nozzle. Not infrequently, inattentive vehicle operators have been known to drive their vehicles from the refueling area without disengaging the fuel nozzle from the vehicle fillpipe, resulting in damage to the dispenser and/or the vehicle, and often resulting is spillage of fuel and escape of fuel vapors.

SUMMARY OF THE INVENTION

According to one aspect of the invention, a breakaway assembly is described for use in combination with a fuel dispenser apparatus comprising a fuel dispenser unit, a hose connected thereto, and terminating in a fuel delivery nozzle, the hose defining at least a first, fuel conduit for delivery of fuel from the dispenser unit to the nozzle, for filling a vehicle tank. The breakaway assembly is disposed between a first segment of the hose attached to the dispenser unit and a second segment of the hose terminating in the nozzle. The breakaway assembly comprises a first body portion adapted for attachment to the first segment of the hose and a second body portion adapted for attachment to the second segment of the hose. The breakaway assembly has a first, assembled condition in which the first body portion and the second body portion are joined and together define a fuel conduit connecting the fuel conduit of the first hose segment with the fuel conduit of the second hose segment for flow of fuel through the breakaway assembly, and the breakaway assembly has a second condition in which the first body portion and the second body portion are separated. The breakaway assembly further comprises a first fuel valve and a first fuel valve seat, the first fuel valve mounted in the first body portion for movement between a first position, with the first fuel valve spaced from engagement with the first fuel valve seat for permitting flow of fuel within the fuel conduit within the first body portion, and a second position, with the first fuel valve in engagement with the first fuel valve seat for restricting flow of fuel through the fuel conduit within the first body portion, a second fuel valve and a second fuel valve seat, the second fuel valve mounted in the second body portion for movement between a first position, with the second fuel valve spaced from engagement with the second fuel valve seat for permitting flow of fuel within the fuel conduit within the second body portion, and a second position, with the second fuel valve in engagement with the second fuel valve seat for restricting flow of fuel through the fuel conduit within the second body portion. A securement element secures together the first body portion and the second body portion in the first condition, the securement element adapted to release engagement of the first body portion and the second body portion upon application of tension force to the hose, across the breakaway assembly, above a predetermined maximum level. A first spring urges the first fuel valve toward the second position and a second spring urging the second fuel valve toward the second position, and, in the first condition of the breakaway assembly, the first fuel valve and the second fuel valve being urged toward the first positions. During normal operation, the first and second body portions are secured together by the securement element, and the first and second fuel valves are urged toward their first (open) positions, and, upon application to the hose of tension above a predetermined maximum level, the securement element releases, allowing the first and second body portions to separate, and allowing the first and second fuel valves to move toward their second (closed) positions to cease flow of fuel from both body portions.

According to another aspect of the invention, a fuel dispenser assembly comprises a fuel dispenser apparatus comprising a fuel dispenser unit, a hose connected thereto, and terminating in a fuel delivery nozzle, the hose defining at least a first, fuel conduit for delivery of fuel from the dispenser unit to the nozzle, for filling a vehicle tank, and a breakaway assembly, e.g. as described above, disposed between a first segment of the hose attached to the dispenser unit and a second segment of the hose terminating in the nozzle.

Preferred embodiments of either aspect of the invention may include one or more of the following additional features. The securement element comprises a shear member, which, in the first condition of the breakaway assembly, is adapted to secure together the first and second body portions, and, upon application of tension force above the predetermined level, the shear member is adapted to shear to allow the first and second body portions to separate and the breakaway assembly to assume the second condition. The first fuel valve and the second fuel valve are mounted for axial movement. In the first condition, the first fuel valve and the second fuel valve are disposed in engagement in a manner to mutually urge the first fuel valve and the second fuel valve toward the respective first (open) positions. The hose defines the first, fuel conduit for delivery of fuel from the dispenser unit to the nozzle and further defines a second, vapor conduit for vacuum flow of vapor displaced from the vehicle tank, and the first body portion and the second body portion together define a vapor conduit connecting the vapor conduit of the first hose segment with the vapor conduit of the second hose segment for vacuum flow of vapor through the breakaway assembly, the breakaway assembly further comprising: a vapor valve and a vapor valve seat, the vapor valve mounted in the first body portion for movement between a first position, with the vapor valve spaced from engagement with the vapor valve seat for permitting vacuum flow of vapor within the vapor conduit within the first body portion, and a second position, with the vapor valve in engagement with the vapor valve seat for restricting vacuum flow through the vapor conduit within the first body portion, a vapor valve spring urging the vapor valve toward the second position and, in the first condition of the breakaway assembly, the vapor valve being urged toward the first position, whereby, during normal operation, the vapor valve is urged toward its first (open) position, and, upon application to the hose of tension above a predetermined maximum level, the securement element releases, allowing the first and second body portions to separate, and allowing the vapor valve to move toward its second (closed) position to cease vacuum flow through the first body portion. Preferably, the hose is coaxial, and the first conduit for delivery of fuel is a first, outer conduit and the second conduit for vacuum flow of vapor displaced from the vehicle tank is a second, inner conduit, and the vapor valve is mounted for axial movement. More preferably, in the first condition, the vapor valve and the second fuel valve are disposed in engagement in a manner to mutually urge the vapor valve and second fuel valve toward the respective first (open) positions.

Objectives of the invention include providing a coaxial hose breakaway assembly that prevents substantial damage to service station gasoline dispensing equipment in the event of an accidental vehicle drive-off while the hose nozzle is engaged to the vehicle fillpipe. The breakaway assembly is equipped with a shear pin which will fail when the hose is under a tension force of, e.g., 250 pounds maximum. When shear pin failure occurs, the breakaway assembly automatically seals the gasoline passage on the dispenser side of the coupling and on the hose nozzle side of the coupling. In addition, in preferred embodiments, the breakaway assembly also provides for automatic sealing of the vapor passage on the dispenser side of the coupling, thus preventing the vapor vacuum pump from ingesting air or releasing vapor when the vacuum pump is not in operation.

These and other features and advantages of the invention will be seen from the following description of a presently preferred embodiment, and from the claims.

BRIEF DESCRIPTION OF THE DRAWING

FIG. 2 is a side section view of an assembled breakaway hose apparatus of the invention;

FIG. 2A is an end section view of the assembly taken at the line 2A—2A of FIG. 2; and FIG. 3 is a side section view of a disassembled breakaway hose apparatus of the invention.

DESCRIPTION OF THE PREFERRED EMBODIMENTS

Figure 1:
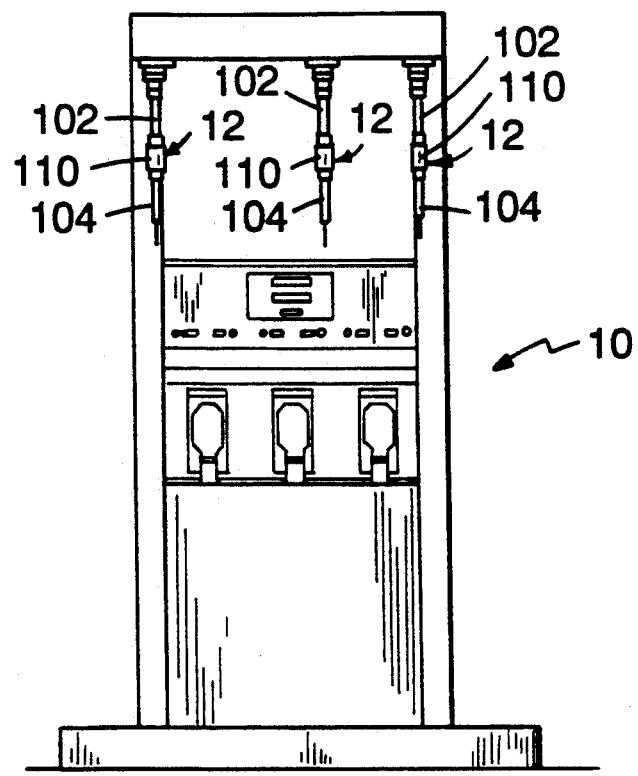
FIGS. 1 and 1A are front and side views respectively of a multi-product fuel dispenser.
Figure 1A:
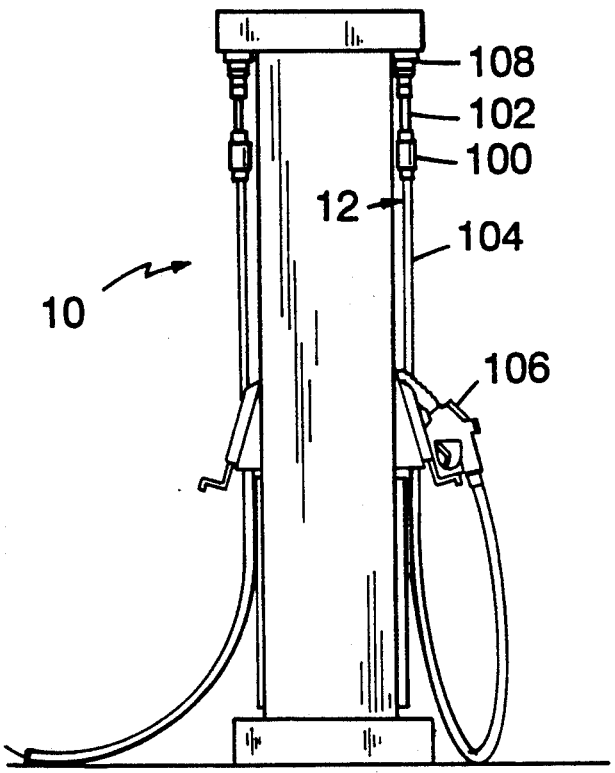

Referring to FIGS. 1 and 1A, a multi-product fuel dispenser 10 of a type employed for dispensing fuel to vehicles at a gasoline station has a coaxial hose 12 equipped with a breakaway assembly 100 of the invention. The hose terminates in a fuel dispensing nozzle 106 for delivery of fuel to the vehicle tank and vacuum removal of displaced vapor. The hose 12 includes a short segment 102 of coaxial hose connected between dispenser hose fitting 108 and the breakaway assembly 100, and a longer segment 104 of coaxial hose connected between the breakaway assembly 100 and the nozzle 106. The short segment 102 of hose ensure that the breakaway assembly 100 will experience only axial tension forces when the nozzle end 106 of the hose 104 is pulled taut by accidental vehicle drive-off.

Referring now to FIG. 2, the coaxial hose, e.g. segment 102 defines a first outer passage 103 for delivery of fuel and a coaxial second inner passage 105 for vacuum return of vapor dispensed from the vehicle fuel tank.

In FIG. 2, the breakaway assembly 100 is shown in its normal operating state. The breakaway assembly 100 consists of two main body parts 110, 114. The nozzle-end body part 110 is threaded to the hose fitting 112 of hose segment 104. Dispenser end body part 114 is similarly threaded to the hose fitting 120 of hose segment 102. The body parts 110, 114 are axially restrained from separation by extension pin 115 of shear screw 116 extending into the shear bushing 118. The bushing 118 in turn is secured in the cylindrical side-wall of the body 114.

In assembled state, the main body parts together define a first, outer conduit 111 which connects the outer passages 103 of hose segments 102, 104 for passage of fuel through the breakaway assembly. O-ring seals 122, 124, and 126 provide sealing to prevent external leakage of fuel (gasoline) from the conduit 111. In particular, the nozzle end body part 110 defines first outer conduit segment 111a and the dispenser end body part 114 defines second outer conduit segment 111b.

In the preferred embodiment, the main body parts further enclose gasoline shutoff valves 128, 130 which define a second, inner conduit 113 which connects the inner passages 105 of hose segments 102, 104 for return passage of vapor fuel through the breakaway assembly. In particular, the nozzle end shutoff valve 128 defines first inner conduit segment 113a and the dispenser end shutoff valve defines second inner conduit segment 113b.

Centrally-located within conduit 111 of the breakaway assembly 100 are gasoline shut-off valves 128, 130. Valve 128 is mounted within body part 110 and located on the nozzle side of the breakaway assembly. Valve 130 is mounted within body part 114 and located on the dispenser side of the breakaway assembly. The valves 128, 130 are mounted within the respective body parts 110, 114 for axial movement between first positions (FIG. 2) for allowing flow of fuel through the conduit 111 within the breakaway assembly, and second positions (FIG. 3) when the main body parts are disassembled, as described more fully below. In its second position, valve 128 is adapted to resist escape of fuel from within the hose segment 104, thus reducing the volume of any spill that might otherwise occur. In its second position, valve 130 is adapted to resist flow of fuel from the dispenser, through hose segment 102. The valves 128, 130 are equipped with o-rings 132, 132' disposed in the respective second positions for sealing engagement against the opposed bore wall surfaces 134, 136 (FIG. 2).

Referring to FIG. 3, when the main body parts are separated, the gasoline valves 128, 130 are urged toward their respective second positions sealing the gasoline passages under the influence of compression springs 138, 140. However, when the main body parts 110, 114 are assembled (as in FIG. 2), the bias of compression springs 138, 140 is overcome, and the valves are urged toward their respective first positions, with the o-ring seals 132, 132' spaced from the opposed wall surfaces, thus to permit flow.

In the preferred embodiment, a vapor valve 144 is mounted within the breakaway assembly 100 for axial movement in vapor passage 113 movement between a first position (FIG. 2) for allowing vacuum flow of vapor through the conduit 111 within the breakaway assembly, and a second position (FIG. 3) when the main body parts are disassembled, as described more fully below. In its second position, vapor valve 144 is adapted to seal the end of conduit segment 113b in a manner to prevent the vapor vacuum pump from ingesting air, or from releasing vapor when the vacuum pump is not in operation. The vapor valve 144 is urged toward its first, sealing position by compression spring 142, which, when the main body parts are separated (FIG. 3), acts to force valve 144 to engage o-ring seal 146 in contact with conical valve seat surface 148 internal to gasoline valve 130. In the preferred embodiment, the compression spring 142 provides a predetermined force several times that required to hold the o-ring seal 146 in sealing engagement with seat 148 when the vacuum level in chamber 150 is 120 inches water column (WC).

Referring now again the FIG. 2, the two main body parts 110, 114 of the breakaway assembly are brought together with axial force and rotationally positioned by engaging dowel pin 152 fixed to body 110 into receiving hole 154 in the opposed surface of body 114. When the centerline of the threaded hole for receiving the shear pin extension 115 is aligned with the shear bushing 118, the shear screw 116 is installed. When the axial force is removed, the shear pin is the only restraint preventing separation of the breakaway assembly body parts.

In the assembled state, the internal gasoline shut-off valves 128, 130 are disposed in contact and held in a central position along the axis, A, of the breakaway assembly by equal and opposite compressive forces developed by springs 138, 140, partially counteracted by compression spring 142 as the result of displacing vapor valve 144 from sealing engagement with valve 130. That is, in assembled state, the valve 128 mounted in main body part 110 and valves 130, 144 mounted in main body part 114 are mutually engaged in a manner to overcome the compression forces of spring 138 and springs 140, 142, respectively, to position each of the valves 128, 130, 144 in its respective first position, thus to allow flow of fuel and vacuum flow of vapor through the breakaway assembly.

Referring now to FIG. 3, when a predetermined tension force, e.g. 250 pounds maximum, is applied at the nozzle end of the hose 12, the shear screw pin fails, allow the main body parts 110, 114 to separate. Spring 138 acts upon gasoline valve 128 to move the valve to its second position, with o-ring seal 132 disposed in sealing engagement with bore wall surface 134, thus to prevent escape of fuel from hose segment 104. At the same time, spring 140 acts upon gasoline valve 130 to move the valve to its second position, with o-ring seal 132' disposed in sealing engagement with bore wall surface 136, thus to prevent escape of fuel from hose segment 102 and dispenser 10, and spring 142 acts upon Vapor valve 144 to move the valve to its second position, with o-ring seal 146 disposed in sealing engagement with seat 148, thus to seal vapor passage 105.

O-ring seal 156 and u-cup seals 158 seal the gasoline against leakage into the vapor passages. O-ring seal 156 is installed with the standard dimensional interference to create a good static seal. The u-cup seals 158 are selected to permit movement of the gasoline shut-off valves without restraint under the limited force available in the compression springs 138, 140. It is also desirable that the o-ring seal 156 resist axial movement to separate the two valves 128, 130 because this tends to assist the compression springs to close the respective gasoline valves during the first portion of breakaway assembly separation with shear screw failure.

FIG. 3 shows the shear screw 116 after failure of shear pin 115. This part is field-replaceable, thus permitting repeated use of the breakaway assembly 100 as a safety device. The outer body design is such that the body part 110 which mounts the shear screw 116 and dowel pin 152 is best suited to survive repeated impact with the driveway surface without affecting surfaces critical for reassembly to the normal operating state. Body 114 with the exposed o-ring seal 126 and close-fitting external cylindrical surface 160 remain attached to the short section 102 of hose coupled to the dispenser 10, thus avoiding damaging impact with the driveway surface.

The breakaway assembly 100 of the invention uniquely takes advantage of the existing coaxial hose vapor tube adapter 162 to provide dynamic sealing when breakaway assembly separation occurs and also to provide static sealing in both the normal operating state and the full separation condition. This concept substantially reduces the size, complexity and number of parts that would otherwise be required, e.g. if the hose fittings 112, 120 threaded into receptacles providing stationary sealing for the vapor tube adapter 162. This alternative approach would require essentially duplicating the vapor tube adapters as permanent components of the breakaway assembly, thus lengthening the overall assembly if the same sealing diameters were used as depicted for u-cup seals 158 or, conversely, the outside diameter of the breakaway assembly would increase if this function were achieved by enlarging the u-cup seals 158 sufficiently to provide a receptacle for the vapor tube adapter 162 internal to the cylindrical protrusion supporting the enlarged u-cups.

Other embodiments are within the following claims. For example, a breakaway assembly of the invention for use with a fuel dispenser lacking a coaxial vapor recovery arrangement may include only gasoline valves.

What is claimed is:

1. A breakaway assembly for use in combination with a fuel dispenser apparatus comprising a fuel dispenser unit, a coaxial hose connected thereto, and terminating in a fuel delivery nozzle, the hose defining a first, outer fuel conduit for delivery of fuel from the dispenser unit to the nozzle, for filling a vehicle tank, and a second, inner vapor conduit, coaxial with said first, outer fuel conduit, for vacuum flow of vapor displaced from the vehicle tank, said breakaway assembly disposed between a first segment of the hose attached to the dispenser unit and a second segment of the hose terminating in the nozzle, said breakaway assembly comprising:
a first body portion adapted for attachment to the first segment of the hose and a second body portion adapted for attachment to the second segment of the hose,
said breakaway assembly having a first, assembled condition in which said first body portion and said second body portion are joined and together define a fuel conduit connecting the fuel conduit of the first hose segment with the fuel conduit of the second hose segment for flow of fuel through the breakaway assembly, and together define a vapor conduit connecting the vapor conduit of the first hose segment with the vapor conduit of the second hose segment for vacuum flow of vapor through the breakaway assembly, and said breakaway assembly having a second condition in which said first body portion and said second body portion are separated, said breakaway assembly further comprising:
a first fuel valve and a first fuel valve seat, said first fuel valve mounted in said first body portion for movement between a first position, with said first fuel valve spaced from engagement with aid first fuel valve seat for permitting flow of fuel within said fuel conduit within said first body portion, and a second position, with said first fuel valve in engagement with said first fuel valve seat for restricting flow of fuel through said fuel conduit within said first body portion, a second fuel valve and a second fuel valve seat, said second fuel valve mounted in said second body portion for movement between a first position, with said second fuel valve spaced from engagement with said second fuel valve seat for permitting flow of fuel within said fuel conduit within said second body portion, and a second position, with said second fuel valve in engagement with aid second fuel valve seat for restricting flow of fuel through said fuel conduit within said second body portion, a vapor valve and a vapor valve seat, said vapor valve mounted in said first body portion for movement between a first position, with aid vapor valve spaced from engagement with said vapor valve seat for permitting vacuum flow of vapor within said vapor conduit within said first body portion, and a second position, with said vapor valve in engagement with said vapor valve seat for restricting vacuum flow through said vapor conduit within said first body portion, and a securement element securing together said first body portion and said second body portion in said first condition, said securement element adapted to release engagement of said first body portion and said second body portion upon application of tension force to the hose, across said breakaway assembly, above a predetermined maximum level, a first spring urging said first fuel valve toward said second position and a second spring urging said second fuel valve toward said second position, and, in said first condition of said breakaway assembly, said first fuel valve and said second fuel valve being urged toward said first positions, and a vapor valve spring urging said vapor valve toward said second position and, in said first condition of said breakaway assembly, said vapor valve being urged toward said first position, whereby, during normal operation, the first and second body portions are secured together by the securement element, and the first and second fuel valves and the vapor valve are all urged toward their respective first positions, and, upon application to the hose of tension above a predetermined maximum level, the securement element releases, allowing the first and second body portions to separate, and allowing the first and second fuel valves to move toward their second positions to cease flow of fuel from both body portions and further allowing the vapor valve to move toward its second position to cease vacuum flow through the first body portion.

2. The breakaway assembly of claim 1 wherein said securement element comprises a shear member, said shear member, in the first condition of said breakaway assembly, adapted to secure together said first and second body portions, and, upon application of tension force above said predetermined level, said shear member being adapted to shear to allow said first and second body portions to separate and the breakaway assembly to assume the second condition.

3. The breakaway assembly of claim 1 wherein said first fuel valve and said second fuel valve are mounted for axial movement.

4. The breakaway assembly of claim 1 wherein, in said first condition, said first fuel valve and said second fuel valve are disposed in engagement in a manner to mutually urge said first fuel valve and said second fuel valve toward said respective first (open) positions.

5. The breakaway assembly of claim 1 wherein said vapor valve is mounted for axial movement.

6. The breakaway assembly of claim 5 wherein, in said first condition, said vapor valve and said second fuel valve are disposed in engagement in a manner to mutually urge said vapor valve and second fuel valve toward said respective first (open) positions.

7. A fuel dispenser assembly comprising:
a fuel dispenser apparatus comprising a fuel dispenser unit, a coaxial hose connected thereto, and terminating in a fuel delivery nozzle, said hose defining a first, fuel conduit for delivery of fuel from said dispenser unit to said nozzle, for filling a vehicle tank, and a second, inner vapor conduit, coaxial with said first, outer fuel conduit, for vacuum flow of vapor displaced from the vehicle tank, and a breakaway assembly disposed between a first segment of said hose attached to said dispenser unit and a second segment of said hose terminating in said nozzle, said breakaway assembly comprising:
a first body portion adapted for attachment to said first segment to said hose and a second body portion adapted for attachment of said second segment of said hose, said breakaway assembly having a first, assembled condition in which said first body portion and said second body portion are joined and together define a fuel conduit connecting said fuel conduit of said first hose segment with said fuel conduit of said second hose segment for flow of fuel through said breakaway assembly, and together define a vapor conduit connecting the vapor conduit of the first hose segment with the vapor conduit of the second hose segment for vacuum flow of vapor through the breakaway assembly, and said breakaway assembly having a second condition in which said first body portion and said second body portion are separated, said breakaway assembly further comprising:
a first fuel valve and a first fuel valve seat, said first fuel valve mounted in said first body portion for movement between a first position, with said first fuel valve spaced from engagement with said first fuel valve seat for permitting flow of fuel within said fuel conduit within said first body portion, and a second position, with said first fuel valve in engagement with said first fuel valve seat for restricting flow of fuel through sad fuel conduit within said first body portion, a second fuel valve and a second fuel valve seat, said second fuel valve mounted in said second body portion for movement between a first position, with said second fuel valve spaced from engagement with said second fuel valve seat for permitting flow of fuel within said fuel conduit within said second body portion, and a second position, with said second fuel valve in engagement with said second fuel valve seat for restricting flow of fuel through said fuel conduit within said second body portion, a vapor valve and a vapor valve seat, said vapor valve mounted in said first body portion for movement between a first position, with said vapor valve spaced from engagement with said vapor valve seat for permitting vacuum flow of vapor within said vapor conduit within said first body portion, and a second position, with said vapor valve in engagement with said vapor valve seat for restricting vacuum flow through said vapor conduit within said first body portion, and a securement element securing together with said first body portion and said second body portion in said first condition, said securement element adapted to release engagement of said first body portion and said second body portion upon application of tension force to said hose, across said breakaway assembly, above a predetermined maximum level, a first spring urging said first fuel valve toward said second position and a second spring urging said second fuel valve toward said second position, and, in said first condition of said breakaway assembly, said first fuel valve and said second fuel valve being urged toward said first positions, and a vapor valve spring urging said vapor valve toward said second position and, in said first condition of said breakaway assembly, said vapor valve being urged toward said first position, whereby, during normal operation, the first and second body portions are secured together by the securement element, and the first and second fuel valves and the vapor valve are all urged toward their respective first positions, and, upon application to the hose of tension above a predetermined maximum level, the securement element releases, allowing the first and second body portions to separate, and allowing the first and second fuel valves to move toward their second positions to cease flow of fuel from both body portions and further allowing the vapor valve to move toward its second position to cease vacuum flow through the first body portion.

8. The fuel dispenser assembly of claim 7 wherein said securement element comprises a shear member, said shear member, in the first condition of said breakaway assembly, adapted to secure together said first and second body portions, and, upon application of tension force above said predetermined level, said shear member being adapted to shear to allow said first and second body portions to separate and the breakaway assembly to assume the second condition.

9. The fuel dispenser assembly of claim 7 wherein said first fuel valve and said second fuel valve are mounted for axial movement.

10. The fuel dispenser assembly of claim 7 wherein, in said first condition, said first fuel valve and said second fuel valve are disposed in engagement in a manner to mutually urge said first fuel valve and said second fuel valve toward said respective first (open) positions.

11. The fuel dispenser assembly of claim 9 wherein said vapor valve is mounted for axial movement.

12. The fuel dispenser assembly of claim 11 wherein, in said first condition, said vapor valve and said second fuel valve are disposed in engagement in a manner to mutually urge said vapor valve and second fuel valve toward said respective first (open) positions.

* * * * *

UNITED STATES PATENT AND TRADEMARK OFFICE
CERTIFICATE OF CORRECTION

PATENT NO. : 5,297,574

DATED : March 29, 1994

INVENTOR(S) : James W. Healy

It is certified that error appears in the above-identified patent and that said Letters Patent is hereby corrected as shown below:

Col. 5, line 43, "Vapor" should be --vapor--.

Col. 6, claim 1, line 64, "aid" should be --said--.

Col. 7, claim 1, line 11, "aid" should be --said--.

Col. 7, claim 1, line 16, "aid" should be --said--.

Col. 7, claim 1, line 49, after "first" insert --(open)--.

Col. 7, claim 1, line 55, after "second" insert --(closed)--.

Col. 7, claim 1, line 58, after "second" insert --(closed)--.

Col. 8, claim 7, line 31, "to" should be --of--.

Col. 8, claim 7, line 58, "sad" should be --said--.

Col. 10, claim 7, line 2, after "first" insert --(open)--.

Col. 10, claim 7, line 7, after "second" insert --(closed)--.

Col. 10, claim 7, line 10, after "second" insert --(closed)--.

UNITED STATES PATENT AND TRADEMARK OFFICE
CERTIFICATE OF CORRECTION

PATENT NO. : 5,297,574
DATED : March 29, 1994
INVENTOR(S) : James W. Healy

It is certified that error appears in the above-indentified patent and that said Letters Patent is hereby corrected as shown below:

Col. 10 claim 15, line 29, "9" should be --7--.

Signed and Sealed this

Fifth Day of December, 1995

Attest:

BRUCE LEHMAN

*Attesting Officer*  *Commissioner of Patents and Trademarks*

(12) EX PARTE REEXAMINATION CERTIFICATE (5388th)
United States Patent
Healy

(10) Number: US 5,297,574 C1
(45) Certificate Issued: Jun. 6, 2006

(54) FUEL DISPENSING HOSE BREAKAWAY ASSEMBLY

(75) Inventor: James W. Healy, Hollis, NH (US)

(73) Assignee: Healy Systems, Inc., Hudson, NH (US)

Reexamination Request:
No. 90/005,918, Jan. 29, 2001

Reexamination Certificate for:
Patent No.: 5,297,574
Issued: Mar. 29, 1994
Appl. No.: 08/046,996
Filed: Apr. 13, 1993

Certificate of Correction issued Dec. 5, 1995.

(51) Int. Cl.
*F16L 29/00* (2006.01)
*F16K 17/40* (2006.01)

(52) U.S. Cl. .............................. 137/68.15; 137/614.04; 285/123.17

(58) Field of Classification Search .............. 137/68.15, 137/614.03, 614.04, 614.05, 614; 285/123.17
See application file for complete search history.

(56) References Cited

U.S. PATENT DOCUMENTS

| 3,171,448 | A | 3/1965 | Fromm | 141/293 |
| 4,827,960 | A | 5/1989 | Nitzberg et al. | 137/68.1 |
| 4,905,733 | A | 3/1990 | Carow | 137/614.04 |

*Primary Examiner*—A. Michael Chambers

(57) ABSTRACT

A breakaway assembly for use in combination with a fuel dispenser apparatus is disposed between a segment of the hose attached to a fuel dispenser unit and a second segment of the hose terminating in a nozzle. The breakaway assembly has body portions with a first, assembled condition and a second condition in which the body portions are separated. A fuel valve located in each of the body portion permits flow of fuel when the body parts are assembled and prevents flow upon separation. An element securing the body portions together releases engagement upon application of tension force to the hose, across the breakaway assembly, above a maximum level. In a preferred embodiment, the hose is coaxial and a vapor valve is also disposed within the breakaway assembly.

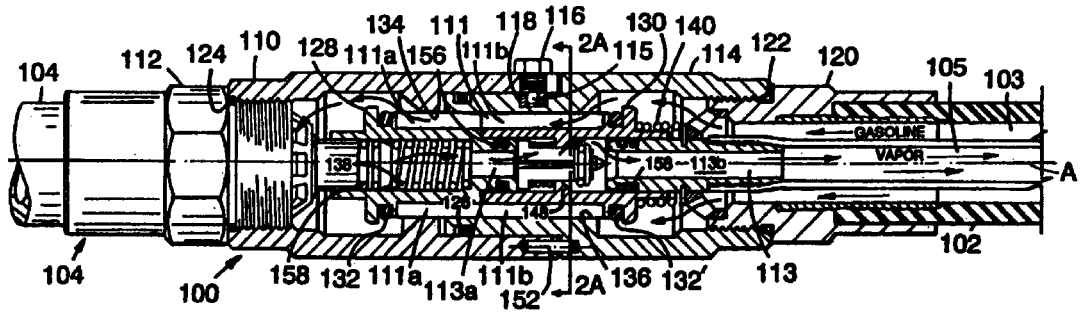

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are determined to be patentable as amended.

Claims 2–6 and 8–12, dependent on an amended claim, are determined to be patentable.

1. A breakaway assembly for use in combination with a fuel dispenser apparatus comprising a fuel dispenser unit, a coaxial hose connected thereto, and terminating in a fuel delivery nozzle, the hose defining a first, outer fuel conduit for delivery of fuel from the dispenser unit to the nozzle, for filling a vehicle tank, and a second, inner vapor conduit, coaxial with said first, outer fuel conduit, for vacuum flow of vapor displaced from the vehicle tank, said breakaway assembly disposed between a first segment of the hose attached to the dispenser unit and a second segment of the hose terminating in the nozzle, said breakaway assembly comprising:
  a first body portion adapted for attachment to the first segment of the hose and a second body portion adapted for attachment to the second segment of the hose,
said breakaway assembly having a first, assembled condition in which said first body portion and said second body portion are joined and together define a fuel conduit connecting the fuel conduit of the first hose segment with the fuel conduit of the second hose segment for flow of fuel through the breakaway assembly, and together define a vapor conduit connecting the vapor conduit of the first hose segment with the vapor conduit of the second hose segment for vacuum flow of vapor through the breakaway assembly, and said breakaway assembly having a second condition in which said first body portion and said second body portion are separated,
said breakaway assembly further comprising:
  a first fuel valve and a first fuel valve seat, said first fuel valve mounted in said first body portion for movement between a first position, with said first fuel valve spaced from engagement with said first fuel valve seat for permitting flow of fuel within said fuel conduit within said first body portion, and a second position, with said first fuel valve in engagement with said first fuel valve seat for restricting flow of fuel through said fuel conduit within said first body portion,
  a second fuel valve and a second fuel valve seat, said second fuel valve mounted in said second body portion for movement between a first position, with said second fuel valve spaced from engagement with said second fuel valve seat for permitting flow of fuel within said fuel conduit within said second body portion, and a second position, with said second fuel valve in engagement with said second fuel valve seat for restricting flow of fuel through said fuel conduit within said second body portion,
  a vapor valve and a vapor valve seat, said vapor valve mounted in said first body portion for movement between a first position, with said vapor valve spaced from engagement with said vapor valve seat for permitting vacuum flow of vapor within said vapor conduit within said first body portion, and a second position, with said vapor valve in engagement with said vapor valve seat for restricting vacuum flow of vapor through said vapor conduit within said first body portion, and
a securement element securing together said first body portion and said second body portion in said first condition, said securement element adapted to release engagement of said first body portion and said second body portion upon application of tension force to the hose, across said breakaway assembly, above a predetermined maximum level,
  a first spring urging said first fuel valve toward said second position and a second spring urging said second fuel valve toward said second position, and, in said first condition of said breakaway assembly, said first fuel valve and said second fuel valve being urged toward said first positions, and
  a vapor valve spring urging said vapor valve toward said second position and, in said first condition of said breakaway assembly, said vapor valve being urged toward said first position,
  *wherein at least one of said first fuel valve and said second fuel valve is mounted for axial movement along breakaway assembly axis,*
  whereby, during normal operation, the first and second body portions are secured together by the securement element, and the first and second fuel valves and the vapor valve are all urged toward their respective first (open) positions, and, upon application to the hose of tension above a predetermined maximum level, the securement element releases, allowing the first and second body portions to separate *axially along the breakaway assembly axis*, and allowing the first and second (closed) fuel valves to move toward their second positions to cease flow of fuel from both body portions and further allowing the vapor valve to move toward its second (closed) position to cease vacuum flow through the first body portion.

7. A fuel dispenser assembly comprising:
a fuel dispenser apparatus comprising a fuel dispenser unit, a coaxial hose connected thereto, and terminating in a fuel delivery nozzle, said hose defining a first, fuel conduit for delivery of fuel from said dispenser unit to said nozzle, for filling a vehicle tank, and a second, inner vapor conduit, coaxial with said first, outer fuel conduit, for vacuum flow of vapor displaced from the vehicle tank, and
a breakaway assembly disposed between a first segment of said hose attached to said dispenser unit and a second segment of said hose terminating in said nozzle,
said breakaway assembly comprising:
  a first body portion adapted for attachment of said first segment of said hose and a second body portion adapted for attachment of said second segment of said hose,
said breakaway assembly having a first, assembled condition in which said first body portion and said second body portion are joined and together define a fuel conduit connecting said fuel conduit of said first hose segment with said fuel conduit of said second hose segment for flow of fuel through said breakaway assembly, and together define a vapor conduit connecting the vapor conduit of the first hose segment with the vapor conduit of the second hose segment for vacuum flow of vapor through the breakaway assembly, and said breakaway assembly having a second condition in which said first body portion and said second body portion are separated, said breakaway assembly further comprising:

a first fuel valve and a first fuel valve seat, said first fuel valve mounted in said first body portion for movement between a first position, with said first fuel valve spaced from engagement with said first fuel valve seat for permitting flow of fuel within said fuel conduit within said first body portion, and a second position, with said first fuel valve in engagement with said first fuel valve seat for restricting flow of fuel through said fuel conduit within said first body portion, a second fuel valve and a second fuel valve seat, said second fuel valve mounted in said second body portion for movement between a first position, with said second fuel valve spaced from engagement with said second fuel valve seat for permitting flow of fuel within said fuel conduit within said second body portion, and a second position, with said second fuel valve in engagement with said second fuel valve seat for restricting flow of fuel through said fuel conduit within said second body portion, a vapor valve and a vapor valve seat, said vapor valve mounted in said first body portion for movement between a first position, with said vapor valve spaced from engagement with said vapor valve seat for permitting vacuum flow of vapor within said vapor conduit within said first body portion, and a second position, with said vapor valve in engagement with said vapor valve seat for restricting vacuum flow through said vapor conduit within said first body portion, and a securement element securing together with said first body portion and said second body portion in said first condition, said securement element adapted to release engagement of said first body portion and said second body portion upon application of tension force to said hose, across said breakaway assembly, above a predetermined maximum level, a first spring urging said first fuel valve toward said second position and a second spring urging said second fuel valve toward said second position, and, in said first condition of said breakaway assembly, said first fuel valve and said second fuel valve being urged toward said first positions, and a vapor valve spring urging said vapor valve toward said second position and, in said first condition of said breakaway assembly, said vapor valve being urged toward said first position, *wherein at least one of said first fuel valve and said second fuel valve is mounted for axial movement along a breakaway assembly axis,* whereby, during normal operation, the first and second body portions are secured together by the securement element, and the first and second fuel valves and the vapor valves are all urged toward their respective first (open) positions, and, upon application to the hose of tension above a predetermined maximum level, the securement element releases, allowing the first and second body portions to separate *axially along the breakaway assembly axis*, and allowing the first and second fuel valves to move toward their second (closed) positions to cease flow of fuel from both body portions and further allowing the vapor valve to move toward its second (closed) position to cease vacuum flow through the first body portion.

* * * * *